United States Patent Office 3,738,941
Patented June 12, 1973

3,738,941
ORGANIC FLUIDS OF THE BORATE-GLYCOL TYPE
John Frederick Collins, East Grinstead, England, assignor to United States Borax & Chemical Corporation, Los Angeles, Calif.
No Drawing. Filed Mar. 3, 1971, Ser. No. 120,723
Claims priority, application Great Britain, Mar. 10, 1970, 11,340/70
Int. Cl. C23f 11/10, 11/18
U.S. Cl. 252—389    6 Claims

ABSTRACT OF THE DISCLOSURE

Condensation products produced by reaction of an alkali metal on alkaline earth metal borate with a glycol having at least seven carbon atoms or mixtures of such glycols with polyhydric alcohols having 3 to about 8 carbon atoms. Useful as corrosion-inhibiting additives for hydraulic or heat-exchanging fluids such as brake fluids.

---

This invention relates to the preparation of novel condensation products derived from alkali metal or alkaline earth metal borates and certain glycols or mixtures of such glycols and polyhydric alcohols. The invention also relates to the use of such condensation products as corrosion-inhibiting additives to hydraulic or heat-exchanging fluids such as brake fluids, and to fluids containing such additives.

It is known to use glycol-borate condensation products for the above purposes. However, the conventional products of this type which are produced from glycols containing from two to six carbon atoms, bring about a substantial increase in the vapor-pressure and hence a depression of the boiling-point of the hydraulic fluids concerned. Recent developments in the production of hydraulic fluids with very high boiling-points have rendered the use of conventional glycol-borate condensation products unsatisfactory.

Thus, the main object of the present invention is to provide an improved additive for hydraulic or heat-exchanging fluids which avoids excessive elevation of vapor-pressure or depression of boiling-points of the fluids, as well as imparting corrosion-inhibiting properties thereto. An acceptable depression of boiling point, suggested by manufacturers of hydraulic fluids, is a maximum of about 10° F. for an addition of 1% by weight of the condensation product.

This may be achieved according to the present invention by use of condensation products formed between glycols having seven or more carbon atoms, or mixtures of said glycols and polyhydric alcohols having from three to about eight carbon atoms, and the borates of the alkali or alkaline earth metals. The borates are preferably the tetraborates, such as $Na_2B_4O_7 \cdot 10H_2O$, $Na_2B_4O_7 \cdot 5H_2O$, $K_2B_4O_7 \cdot 4H_2O$, $CaB_4O_7 \cdot 2H_2O$, and the like. However, other other inorganic borates such as the metaborates and pentaborates of the alkali and alkaline earth metals may also be used if desired.

The glycols which can be used have seven or more carbon atoms, such as up to about 30 carbon atoms. Typical examples are tetraethylene glycol and the liquid polyethylene and polypropylene glycols of the formula $$HO(CH_2CH_2O)_nH \text{ and } HO(CH_2CH_2CH_2O)_nH$$

where $n$ is in the range of from about 4 to about 15. The molecular weights of such polyethylene and polypropylene glycols can range from about 200 to about 600.

The polyhydric alcohols contain from three to about eight carbon atoms. Examples of such alcohols include glycerol, trimethylolpropane, trimethylolethane, 1,2,4-butanetriol and 1,2,6-hexanetriol.

In the practice of this invention, the borate is dissolved in the appropriate glycol and polyhydric alcohol at a concentration which will yield a product of convenient viscosity.

Water is formed in the course of the condensation reaction and can be removed by vacuum distillation at a temperature up to the boiling point of the glycols used. The depression of boiling-point caused by adding compounds made according to this invention to hydraulic fluids may be determined by any convenient method such as SAEJ 1703a.

EXAMPLES A–E

The following reactions were carried out in a rotary evaporator. The borate, glycol and polyhydric alcohols were combined and heated to a maximum temperature of about 160° C. The water was distilled off under a vacuum provided by a water pump (~10 mm. Hg). The boron content of the product was analyzed. Boiling points of Castrol 525B hydraulic fluid containing 1% by weight of the condensate was determined by SAEJ 1703a procedure. Since the boiling point of the fluid without additives varied, results are reported as the drop in boiling point caused by the additive.

Condensation product data

| Example | Alkali metal borate (amount) | Glycol or glycol/polyol mixture (amount) | Boron content of product (percent) | Weight of water removed (g.) | Depression of b.p. of hydraulic fluid (° F.) |
|---|---|---|---|---|---|
| A | $K_2B_4O_7 \cdot 4H_2O$ (30 g.) | Glycerol/tetraethylene glycol (1:1) (200 g.) | 2 | 12 | 2 |
| B | do | Glycerol/tetraethylene glycol (3:1) (200 g.) | 2 | 8 | 4 |
| C | do | Glycerol/tetraethylene glycol (1:3) (200 g.) | 2 | 8 | 10 |
| D | $K_2B_4O_7 \cdot 4H_2O$ (45 g.) | Glycerol/polyethylene glycol* (1:1) (200 g.) | 3 | 17 | 4 |
| E | $Na_2B_4O_7 \cdot 10H_2O$ (38 g.) | Glycerol/tetraethylene glycol (1:1) (200 g.) | 2 | 10 | 8 |

*Molecular weight 200.

Various changes and modifications of the invention can be made and, to the extent that such variations incorporate the spirit of this invention, they are intended to be included within the scope of the appended claims.

What is claimed is:

1. Condensation product formed by dehydration of a mixture of alkali or alkaline earth metal borate with a polyethylene glycol or polypropylene glycol having at least seven carbon atoms and a molecular weight of from about 200 to about 600 and a polyhydric alcohol having three to about eight carbon atoms, the ratio of said glycol to said polyhydric alcohol being about 1:3 to about 3:1.

2. A condensation product in accordance with claim 1 in which said glycol has 7 to 30 carbon atoms.

3. A condensation product in accordance with claim 1 in which the borate is sodium tetraborate.

4. A condensation product in accordance with claim 1 in which the borate is potassium tetraborate.

5. A condensation product in accordance with claim 1 in which glycerol is mixed with said glycol.

6. A condensation product of potassium tetraborate, glycerol and tetraethylene glycol in accordance with claim 1.

References Cited

UNITED STATES PATENTS

| | | | |
|---|---|---|---|
| 3,403,104 | 9/1968 | Sullivan | 252—78 |
| 3,262,961 | 7/1966 | Jordan | 252—75 |
| 2,982,733 | 5/1961 | Wright et al. | 252—75 |
| 3,325,423 | 6/1967 | Jordan | 252—78 |
| 2,979,524 | 4/1961 | Wright | 252—75 |

MAYER WEINBLATT, Primary Examiner

I. GLUCK, Assistant Examiner

U.S. Cl. X.R.

252—75, 78; 260—606.5 B; 423—277